United States Patent
Hwang et al.

(10) Patent No.: US 10,225,116 B2
(45) Date of Patent: Mar. 5, 2019

(54) TRANSMITTER, RECEIVER, AND CONTROL METHOD THEREOF REGARDING TRANSMISSION PACKET HEADER

(71) Applicant: SAMSUNG ELECTRONICS CO., LTD., Suwon-si (KR)

(72) Inventors: Sung-hee Hwang, Suwon-si (KR); Hyun-koo Yang, Seoul (KR); Hak-ju Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/305,028

(22) Filed: Jun. 16, 2014

(65) Prior Publication Data

US 2015/0003472 A1 Jan. 1, 2015

(30) Foreign Application Priority Data

Jun. 28, 2013 (KR) .................. 10-2013-0075725

(51) Int. Cl.
*H04L 25/14* (2006.01)
*H04H 20/42* (2008.01)
*H04N 21/61* (2011.01)

(52) U.S. Cl.
CPC ........... *H04L 25/14* (2013.01); *H04H 20/423* (2013.01); *H04N 21/6112* (2013.01)

(58) Field of Classification Search
CPC .............................. H04L 1/0083; H04L 25/14
See application file for complete search history.

(56) References Cited

U.S. PATENT DOCUMENTS

| | | | |
|---|---|---|---|
| 9,167,281 B2 | 10/2015 | Petrov et al. | |
| 2003/0135635 A1* | 7/2003 | Levi | H04L 29/06 709/231 |
| 2006/0136356 A1* | 6/2006 | Hua | G06F 17/30115 |
| 2009/0092138 A1* | 4/2009 | Joo | H04W 28/065 370/392 |
| 2010/0046415 A1 | 2/2010 | Kim et al. | |

(Continued)

FOREIGN PATENT DOCUMENTS

| | | |
|---|---|---|
| EP | 3001689 A1 | 3/2016 |
| JP | 2013-520035 A | 5/2013 |

(Continued)

OTHER PUBLICATIONS

Correia, et al.; "DVB-T2 Modulator Design Supporting Multiple PLP and Auxiliary Streams", IEEE International Symposium on Broadband Multimedia Systems and Broadcasting, Shanghai, China, Mar. 2010, 8 pages total.

(Continued)

*Primary Examiner* — Nicholas Sloms
(74) *Attorney, Agent, or Firm* — Sughrue Mion, PLLC

(57) ABSTRACT

A transmitter includes a baseband frame generator configured to generate a baseband frame comprising a baseband header, a data field, and a padding field; and a mapper to map a plurality of data streams to the data field, wherein the baseband frame generator is further configured to insert a padding length field indicating a byte number of the padding field in the baseband frame, and insert a padding indicator field indicating information about the padding length field in the baseband header.

2 Claims, 13 Drawing Sheets

(a) Method 1

| | | |
|---|---|---|
| 910~ | 00 | No padding (No PADL field) |
| 920~ | 01 | 1 byte padding (No PADL field) |
| 930~ | 10 | PADL field (1 byte) |
| 940~ | 11 | PADL field (2 bytes) |

(b) Method 2

| | | |
|---|---|---|
| 950~ | 00 | No padding (No PADL field) |
| 960~ | 01 | 1 byte padding (No PADL field) |
| 970~ | 10 | PADL field (2 bytes) |
| 980~ | 11 | Reserved |

(56) References Cited

U.S. PATENT DOCUMENTS

| | | | |
|---|---|---|---|
| 2010/0208749 A1* | 8/2010 | Chun | H04L 69/22 370/474 |
| 2010/0238931 A1* | 9/2010 | Meyer | H04L 69/22 370/392 |
| 2012/0207068 A1 | 8/2012 | Watson et al. | |
| 2012/0254684 A1 | 10/2012 | Loghin et al. | |
| 2012/0307842 A1 | 12/2012 | Petrov et al. | |
| 2012/0314762 A1* | 12/2012 | Herrmann | H04N 21/2362 375/240.02 |
| 2014/0281530 A1* | 9/2014 | Song | H04L 63/123 713/168 |
| 2016/0037192 A1 | 2/2016 | Petrov et al. | |

FOREIGN PATENT DOCUMENTS

| | | |
|---|---|---|
| WO | 2010/087546 A1 | 8/2010 |
| WO | 2011/091850 A1 | 8/2011 |

OTHER PUBLICATIONS

Search Report dated Oct. 7, 2014, issued by the International Searching Authority in counterpart International Application No. PCT/KR2014/005592.

Written Opinion dated Oct. 7, 2014, issued by the International Searching Authority in counterpart International Application No. PCT/KR2014/005592.

Digital Video Broadcasting (DVB); "Frame structure channel coding and modulation for a second generation digital terrestrial television broadcasting system (DVB-T2)", TM 3980, ETSI, Mar. 17, 2008, Geneva, Switzerland, XP017802195. (134 pages total).

Communication dated Dec. 15, 2016 issued by the European Patent Office in counterpart European Patent Application No. 14818369.2.

Communication dated Feb. 13, 2017 issued by the Mexican Institute of Industrial Property in counterpart Mexican Patent Application No. MX/a/2015/017350.

Communication dated Feb. 5, 2018, issued by the State Intellectual Property Office of the People's Republic of China in counterpart Chinese Patent Application No. 201480037109.0.

Wang, Z., "Study on Input Processing and BICM Module in DVB-T2 Standard and Software Implementation", Jan. 2013, Collection of Information Technology of the Full-text Database of Chinese Master's Theses, 103 pages total.

Communication dated Oct. 11, 2017, from the Mexican Patent Office in counterpart application No. MX/a/2015/017350.

Communication dated May 7, 2018, from the Mexican Patent Office in counterpart application No. MX/a/2015/017350.

Communication dated Aug. 24, 2018, issued by the State Intellectual Property Office of the People's Republic of China in counterpart Chinese Patent Application No. 201480037109.0.

Communication dated Nov. 9, 2018 issued by the Mexican Patent Office in Counterpart Mexican Application No. MX/a/2015/017350.

* cited by examiner

Method 1

| | | |
|---|---|---|
| 910 | 00 | No padding (No PADL field) |
| 920 | 01 | 1 byte padding (No PADL field) |
| 930 | 10 | PADL field (1byte) |
| 940 | 11 | PADL field (2bytes) |

(b)

Method 2

| | | |
|---|---|---|
| 950 | 00 | No padding (No PADL field) |
| 960 | 01 | 1 byte padding (No PADL field) |
| 970 | 10 | PADL field (2bytes) |
| 980 | 11 | Reserved |

1000

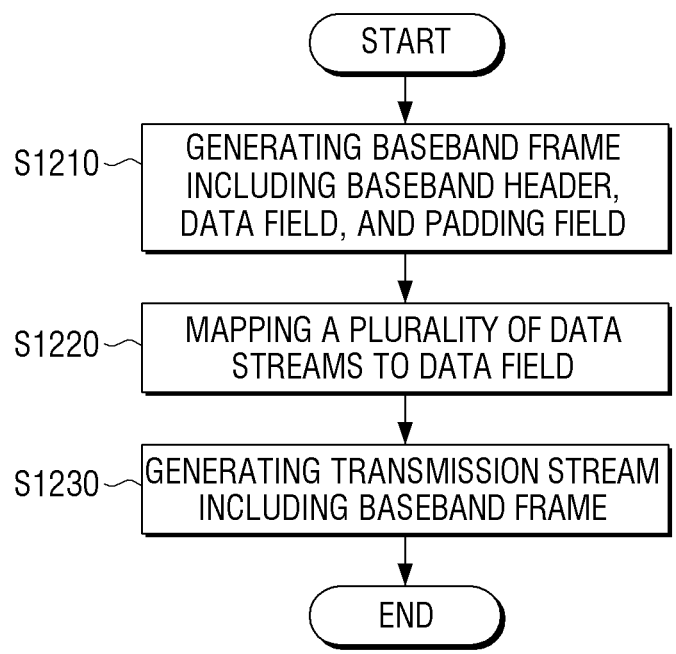

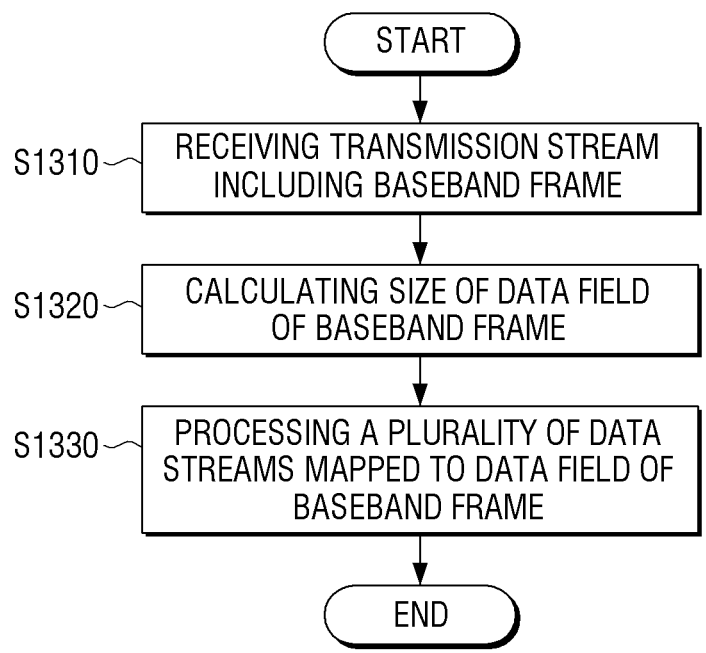

TRANSMITTER, RECEIVER, AND CONTROL METHOD THEREOF REGARDING TRANSMISSION PACKET HEADER

CROSS-REFERENCE TO RELATED APPLICATIONS

This application claims priority from Korean Patent Application No. 10-2013-0075725 filed Jun. 28, 2013 in the Korean Intellectual Property Office, the disclosure of which is incorporated herein by reference in its entirety.

BACKGROUND

1. Field

Apparatuses and methods consistent with exemplary embodiments relate to a transmitter, a receiver, and a control method thereof, and more particularly, to a transmitter, a receiver, and a control method thereof that uses a Digital Video Broadcasting the Second Generation Terrestrial (DVB-T2) method.

2. Description of the Related Art

The DVB-T2 is a second-generation European terrestrial digital broadcasting standard to improve performance of Digital Video Broadcasting—Terrestrial (DVB-T) that is currently selected as standard and started to be serviced in more than 35 countries around the world including Europe. The DVB-T2 achieves increasing of transmission capacity and high bandwidth efficiency by applying the latest technology such as low density parity check (LDPC) codes, a 256 QAM modulation method, etc. Accordingly, the DVB-T2 has an advantage of being able to provide a variety of high quality services such as HDTV in a limited band.

On the other hand, in order to use the DVB-T2 method, a transmitter randomly divides data streams, maps the divided data streams to a data field of a baseband frame, and attaches a baseband header.

Also, if the data streams are not sufficiently mapped to the data field or if a network delay occurs, a padding field is inserted in the baseband frame.

When performing L1 encapsulation, a data field length (DFL) field stores DFL information, and thus, plays a role to directly inform the length of the DFL. However, there is a problem that even if the padding field is not inserted in the baseband frame, the DFL field directly indicating the DFL length is inserted in the baseband header (BBHeader), which is an overhead in transmission of the data streams.

SUMMARY

One or more exemplary embodiments are provided to address the above drawbacks and other problems associated with the conventional arrangement. One or more exemplary embodiments provide a transmitter, a receiver and a control method thereof for determining a length of a data field depending on whether padding is inserted or not.

According to an aspect of an exemplary embodiment, there is provided a transmitter, which may include: a baseband frame generator to generate a baseband frame comprising a baseband header, a data field, and a padding field; and a mapper to map a plurality of data streams to the data field.

Here, the baseband frame generator may insert a padding length field indicating a byte number of the padding field in the baseband frame, and insert a padding indicator field indicating information about the padding length field in the baseband header.

The baseband frame generator may add the padding field based on a byte number of the data field, set a byte number of the padding length field depending on the byte number of the added padding field, and indicate information about the set byte number of the padding length field in the padding indicator field.

The padding indicator field may include one of a first value defining absence of the padding length field, a second value indicating that the padding length field is one byte, and a third value indicating that the padding length field is two bytes.

In detail, if the byte number of the padding field is zero, the baseband frame generator may not insert the padding field and the padding length field, and record the first value in the padding indicator field. If the byte number of the padding field is greater than or equal to one and less than or equal to 256, the baseband frame generator may set the padding length field as one byte, and record the second value in the padding indicator field. If the byte number of the padding field is greater than 256, the baseband frame generator may set the padding length field as two bytes, and record the third value in the padding indicator field.

When an ISSY field is added to the baseband frame, the baseband frame generator may add an ISSY indicator field indicating presence or absence of the ISSY field in the baseband header.

If the byte number of the padding field is less than or equal to a predetermined size, the baseband frame generator may add one padding length field indicating a total byte number of the padding field within the padding field, and, if the byte number of the padding field is greater than the predetermined size, the baseband frame generator may insert a first padding length field and a second padding length field within the padding field, wherein the first padding length field may indicate presence of the second padding length field within the padding field, and the second padding length field may indicate the total byte number of the padding field.

The padding indicator field may include a first value indicating that the padding field does not exist or a second value indicating that the padding field exists.

If the byte number of the padding field is zero, the baseband frame generator may not insert the padding field and the padding length field, and record the first value in the padding indicator field. If the byte number of the padding field is greater than or equal to one and less than or equal to 256, the baseband frame generator may set the padding length field one byte, and record the second value in the padding indicator field. If the byte number of the padding field is greater than 256, the baseband frame generator may add the first padding length field and the second padding length field within the padding field, and record the second value in the padding indicator field. Here, the first padding length field may be one byte, and the second padding length field may be two bytes.

The first padding length field may be set to a value expressed by one byte or less, and the second padding length field may be inserted in a place corresponding to the set value of the first padding length field with a size of two bytes.

If an ISSY field is added to the baseband frame, the baseband frame generator may add an ISSY indicator field indicating presence or absence of the ISSY field in the baseband header.

The padding indicator field may include one of a first value indicating absence of the padding length field and the padding field, a second value indicating that the padding length field does not exist and the padding field is a predetermined number of bytes, a third value indicating that the padding length field is one byte, and a fourth value indicating that the padding length field is two bytes. The predetermined number may be one.

If the byte number of the padding field is zero, the baseband frame generator may not insert the padding field and the padding length field, and record the first value in the padding indicator field. If the byte number of the padding field is one, the baseband frame generator may not insert the padding length field, and record the second value in the padding indicator field. If the byte number of the padding field is greater than one and less than or equal to 256, the baseband frame generator may set the padding length field as one byte, and record the third value in the padding indicator field. If the byte number of the padding field is greater than 256, the baseband frame generator may set the padding length field as two bytes, and record the fourth value in the padding indicator field.

The padding indicator field may include one of a first value indicating absence of the padding length field and the padding field, a second value indicating that the padding length field does not exist and the padding field is one byte, and a third value indicating that the padding length field is two bytes.

If the byte number of the padding field is zero, the baseband frame generator may not insert the padding field and the padding length field, and record the first value in the padding indicator field, if the byte number of the padding field is one, the baseband frame generator may not insert the padding length field, and record the second value in the padding indicator field, and if the byte number of the padding field is greater than one, the baseband frame generator may set the padding length field two bytes, and record the third value in the padding indicator field.

According to an aspect of an exemplary embodiment, there is provided a receiver which may include: a receiving unit to receive a transmission stream comprising a baseband frame; a controller to calculate a size of a data field of the baseband frame; and a processing unit to process a plurality of data streams mapped to the data field of the baseband frame.

Here, the baseband frame may include a baseband header, the data field, a padding field, and a padding length field indicating a byte number of the padding field, and the baseband header may include a padding indicator field indicating information about the padding length field.

The controller may detect information about the padding length field based on the padding indicator field, calculate a byte number of the padding field based on the detected information, and calculate a byte number of the data field based on a byte number of the baseband header, a byte number of the padding length field, and the byte number of the padding field.

If the baseband frame includes an ISSY field, the baseband header may include an ISSY indicator field indicating presence or absence of the ISSY field, and the controller may calculate the byte number of the data field based on the byte number of the baseband header, the byte number of the padding length field, a byte number of the ISSY field, and the byte number of the padding field.

According to an aspect of an exemplary embodiment, there is provided a stream generating method of a transmitter which may include: generating a baseband frame comprising a baseband header, a data field, and a padding field; mapping a plurality of data streams to the data field; and generating a transmission stream comprising the baseband frame.

Here, the baseband frame may include a padding length field indicating a byte number of the padding field, and the baseband header may include a padding indicator field indicating information about the padding length field.

The generating the baseband frame may include adding the padding field based on a byte number of the data field, setting a byte of the padding length field depending on a byte number of the added padding field, and indicating information about the set byte number of the padding length field in the padding indicator field.

The padding indicator field may include one of a first value indicating absence of the padding length field, a second value indicating that the padding length field is one byte, and a third value indicating that the padding length field is two bytes.

The generating the baseband frame may include, if the byte number of the padding field is zero, not inserting the padding field and the padding length field, and recording the first value in the padding indicator field, if the byte number of the padding field is greater than or equal to one and less than or equal to 256, setting the padding length field as one byte, and recording the second value in the padding indicator field, and, if the byte number of the padding field is greater than 256, setting the padding length field as two bytes, and recording the third value in the padding indicator field.

The generating the baseband frame may include, if an ISSY field is added to the baseband frame, adding an ISSY indicator field indicating presence or absence of the ISSY field in the baseband header.

The generating a baseband frame may include, if the byte number of the padding field is less than or equal to a predetermined size, adding one padding length field indicating a total byte number of the padding field within the padding field, and, if the byte number of the padding field is greater than the predetermined size, inserting a first padding length field and a second padding length field within the padding field, wherein the first padding length field may indicate presence of the second padding length field within the padding field, and the second padding length field may indicate the total byte number of the padding field.

The padding indicator field may include a first value indicating that the padding field does not exist or a second value indicating that the padding field exists.

The generating the baseband frame may include, if the byte number of the padding field is zero, not inserting the padding field and the padding length field, and recording the first value in the padding indicator field, if the byte number of the padding field is greater than or equal to one and less than or equal to 256, setting the padding length field as one byte, and recording the second value in the padding indicator field, and, if the byte number of the padding field is greater than 256, adding the first padding length field and the second padding length field within the padding field, and recording the second value in the padding indicator field, wherein the first padding length field may be one byte, and the second padding length field may be two bytes.

The first padding length field may be set to a value expressed by one byte or less, and the second padding length field may be inserted in a place corresponding to the set value of the first padding length field with a size of two bytes.

The generating the baseband frame may include, if an ISSY field is added to the baseband frame, adding an ISSY indicator field indicating presence or absence of the ISSY field in the baseband header.

The padding indicator field may include one of a first value defining absence of the padding length field and the padding field, a second value indicating that the padding length field does not exist and the padding field is one byte, a third value indicating that the padding length field is one byte, and a fourth value indicating that the padding length field is two bytes.

The generating a baseband frame may include, if the byte number of the padding field is zero, not inserting the padding field and the padding length field, and recording the first value in the padding indicator field, if the byte number of the padding field is one, not inserting the padding length field, and recording the second value in the padding indicator field, if the byte number of the padding field is greater than one (1) and less than or equal to 256, setting the padding length field as one byte, and recording the third value in the padding indicator field, and, if the byte number of the padding field is greater than 256, setting the padding length field as two bytes, and recording the fourth value in the padding indicator field.

The padding indicator field may include one of a first value indicating absence of the padding length field and the padding field, a second value indicating that the padding length field does not exist and the padding field is one byte, and a third value indicating that the padding length field is two bytes.

The generating a baseband frame may include, if the byte number of the padding field is zero, not inserting the padding field and the padding length field, and recording the first value in the padding indicator field, if the byte number of the padding field is one, not inserting the padding length field, and recording the second value in the padding indicator field, and, if the byte number of the padding field is greater than one, setting the padding length field as two bytes, and recording the third value in the padding indicator field.

According to an aspect of an exemplary embodiment, there is provided a control method of a receiver which may include: receiving a transmission stream comprising a baseband frame; calculating a size of a data field of the baseband frame; and processing a plurality of data streams mapped to the data field of the baseband frame.

Here, the baseband frame may include a baseband header, the data field, a padding field, and a padding length field indicating a byte number of the padding field, and the baseband header may include a padding indicator field indicating information about the padding length field.

The calculating the size of the data field of the baseband frame may include detecting information about the padding length field based on the padding indicator field, calculating the byte number of the padding field based on the detected information, and calculating a byte number of the data field based on a byte number of the baseband header, a byte number of the padding length field, and the byte number of the padding field.

If the baseband frame includes an ISSY field, the baseband header may include an ISSY indicator field indicating presence or absence of the ISSY field, and the calculating the size of the data field of the baseband frame may include calculating the byte number of the data field based on the byte number of the baseband header, the byte number of the padding length field, a byte number of the ISSY field, and the byte number of the padding field.

According to various exemplary embodiments of the present disclosure, since a length of a data field can be calculated based on a length of a padding field, a size of a baseband header may be reduced compared to a method that directly indicates the length of the data field.

Other objects, advantages and salient features of the present disclosure will become apparent from the following detailed description, which, taken in conjunction with the annexed drawings, discloses exemplary embodiments.

BRIEF DESCRIPTION OF THE DRAWINGS

These and/or other aspects of the present disclosure will become apparent and more readily appreciated from the following description of the exemplary embodiments, taken in conjunction with the accompanying drawings, in which:

FIGS. 9A and 9B are a table illustrating values that are set in a padding indicator field if a padding field of one byte is inserted, according to exemplary embodiments;

FIG. 12 is a flowchart for explaining a stream generating method of a transmitter according to an exemplary embodiment of the present disclosure; and FIG. 13 is a flowchart for explaining a control method of a receiver according to an exemplary embodiment of the present disclosure.

Throughout the drawings, like reference numerals will be understood to refer to like parts, components and structures.

DETAILED DESCRIPTION OF THE EXEMPLARY EMBODIMENTS

Hereinafter, certain exemplary embodiments of the present disclosure will be described in detail with reference to the accompanying drawings.

The matters defined herein, such as a detailed construction and elements thereof, are provided to assist in a comprehensive understanding of this description. Thus, it is apparent that exemplary embodiments may be carried out without those defined matters. Also, well-known functions or constructions are omitted to provide a clear and concise description of exemplary embodiments.

Figure 1:
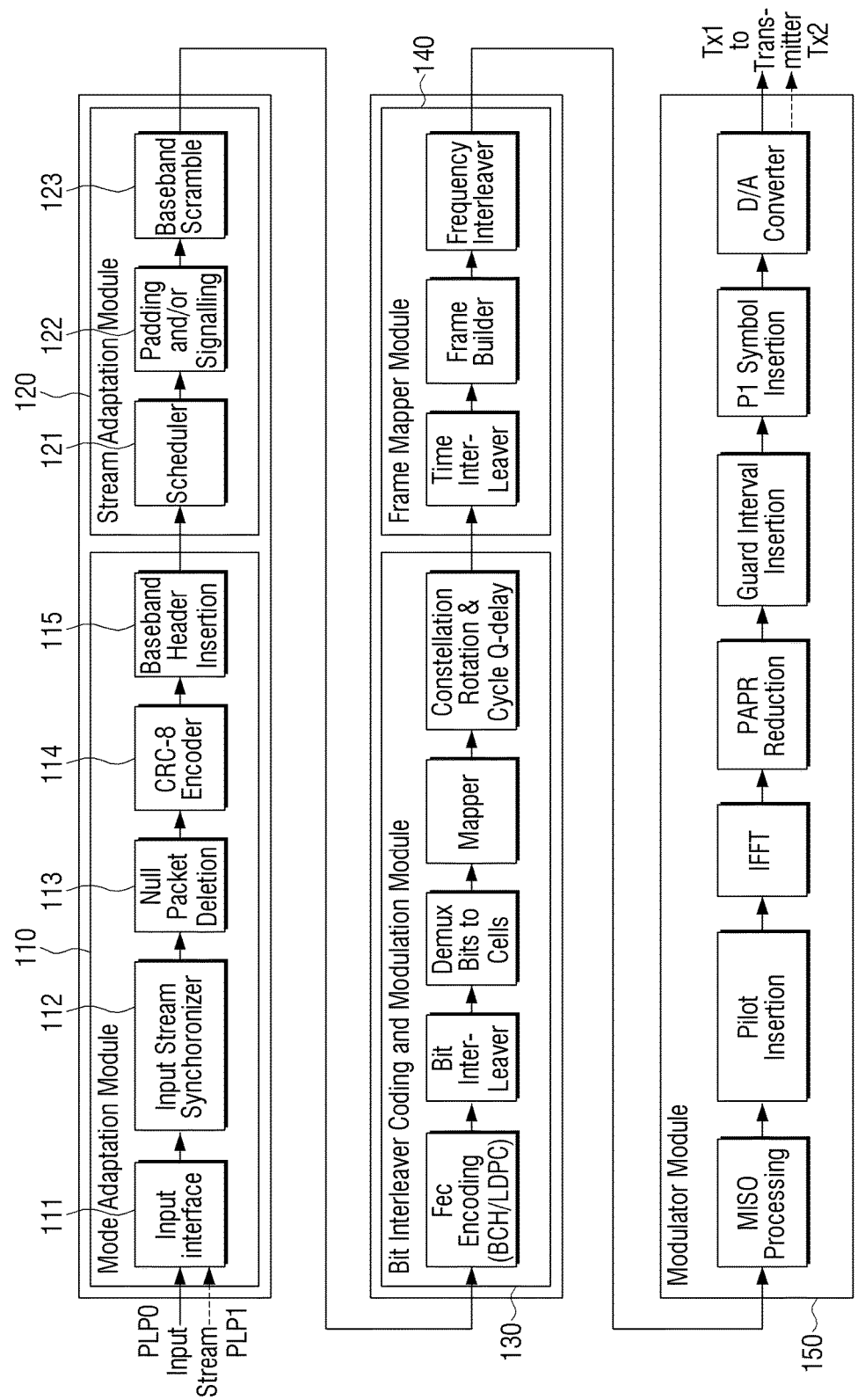
FIG. 1 is a block diagram illustrating a configuration of a digital broadcasting transmitter that uses a DVB-T2 method, according to an exemplary embodiment.

FIG. 1 is a block diagram illustrating a configuration of a digital broadcasting transmitter that uses a DVB-T2 method, according to an exemplary embodiment of the present disclosure.

Referring to FIG. 1, a digital broadcasting transmitter includes a mode adaptation module 110, a stream adaptation module 120, a bit interleaver coding and modulation module 130, a frame mapper module 140, and a modulator module 150.

The mode adaptation module 110 may include an input interface 111, an input stream synchronizer 112, a null packet deletion unit 113, a cyclic redundancy check (CRC)-8 encoder 114, and a baseband header (BBHeader) insertion unit 115.

The mode adaptation module 110 generates a baseband frame including at least one physical layer pipe (PLP) created in an input free processor (not illustrated). Also, when a PLP corresponding to a service is received, the mode adaptation module 110 may separate the received PLP into PLPs that correspond to service components, and then, generate the baseband frame.

Here, the input free processor (not illustrated) may provide at least one PLP to the mode adaptation module 110. The format of the PLP that is input into the mode adaptation module 110 may be one of transport stream (TS), generic encapsulated stream (GES), generic continuous stream (GCS), generic fixed-length packetized stream (GFPS), etc.

The stream adaptation module 120 may include a scheduler 121, an in-band padding and/or signaling insertion unit 122, and a baseband scrambler 123.

Following the mode adaptation module 110, the stream adaptation module 120 receives data in a PLP unit on which the mode adaptation was performed, and performs stream adaptation in a PLP unit.

In relation to the configuration of the digital broadcasting transmitter of the DVB-T2 method as described above, a baseband frame generator 210 of a transmitter 200 to generate a baseband frame according to an exemplary embodiment as described below in reference to FIG. 2 may be applied to the input interface 111, the BBHeader insertion unit 115, and the in-band padding and/or signaling insertion unit 122 as illustrated in FIG. 1.

Figure 2:
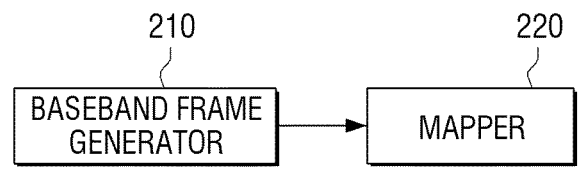
FIG. 2 is a block diagram illustrating a configuration of a transmitter according to an exemplary embodiment.

FIG. 2 is a block diagram illustrating a configuration of a transmitter according to an exemplary embodiment of the present disclosure.

Referring to FIG. 2, the transmitter 200 includes the baseband frame generator 210 and a mapper 220. Here, the baseband frame generator 210 may generate a baseband frame including a BBHeader, a data field, and a padding field.

The mapper 220 may map a plurality of data streams to the data field.

Processes in which the baseband frame generator 210 generates the baseband frame and the mapper 220 maps the data streams to the data field of the generated baseband frame may occur in the input interface 111 and the BBHeader insertion unit 115 of the mode adaptation module 110 and the in-band padding and/or signaling insertion unit 122 of the stream adaptation module 120 as illustrated in FIG. 1.

Referring to FIG. 1, the input interface 111 may map PLPs being inputted as an international logical-bit format. In other words, the input interface 111 may process that a first bit is recognized as a most significant bit (MSB) and each PLP is mapped as the international logical-bit format.

The input interface 111 may perform mapping by separating the inputted PLPs in a logical unit in order to perform forward error correction (FEC) encoding comprising Bose-Chaudhuri-Hocquenghem (BCH) coding and/or low density parity check (LDPC) coding in the following bit interleaver coding and modulation module (BICM) encoder 130. The input interface 111 may generate the baseband frame from the PLPs that were separated and mapped in a logical unit.

A BBHeader may be added to the generated baseband frame. In detail, the BBHeader insertion 115 may insert a header with a fixed size in a front end of the baseband frame to identify a format of the data field of the baseband frame. For example, the BBHeader may include information such as mode adaptation type information indicating TS, GCS, GSE or GFPS, user packet length information, data field length information, user packet sync byte information, etc.

The BBHeader has a size of ten bytes, and is inserted in front of the data field to identify the format of the data field.

MATYPE that is located at the forefront of the BBHeader has a size of two bytes and the mode adaptation type information. Here, the first byte of the two bytes MATYPE is referred to as MATYPE-1, and first two bits of the first byte of the MATYPE-1 is a TS/GS field, and indicates which of GFPS, TS, GCS and GSE the input stream format is. Following one bit is a SIS/MIS field, and indicates whether the baseband frame includes a single input stream or multiple input streams. Following one bit is a CCM/ACM field whether a constant coding and modulation is performed on the baseband frame or a variable coding and modulation is performed on the baseband frame. As following one bit is an input stream synchronization indicator (ISSYI) field, if a set value of the ISSYI field is one, the ISSYI field is enabled so that sync timing is calculated, and if the set value of the ISSYI field is zero, the ISSYI field is disabled. Following one bit is a NPD field, and indicates whether the null packet deletion is enabled or disabled. If the NPD is enabled, the number of deleted null packets is calculated and then added next to a user packet (UP) field. Following two bits are an EXT field, and are left blank to be used for the next generation communication standard.

A UPL field of the BBHeader has a size of two bytes, and stores information about a user packet length. A DFL field has a size of two bytes, and stores information about a data field length. A SYNC field has a size of one byte, and copies and stores a sync value of a user packet. A SYNCD field has a size of two bytes, and stores a bit distance from a starting point of the data field to an UP field that is first transferred after the starting point. A CRC-8 MODE field has a size of one byte, and is a field in which a CRC-8 field to detect an error code and a mode field to determine whether a current mode is a normal mode or a high efficiency mode are combined.

However, unlike the BBHeader of the above-described DVB-T2 standard, a BBHeader according to an exemplary embodiment of the present disclosure has a size of two bytes, and may include a SYNCD field and a padding indicator (PADI) field, or may include a SYNCD field, a PADI field, and an ISSYI field, which will be described later.

This is to reduce a portion which is an overhead by reducing unnecessary portions used in the BBHeader.

Referring to FIG. 2, the baseband frame generator 210 inserts a padding length field (PADL) indicating the byte number of the padding field within the baseband frame, that is, the number of bytes that the padding field occupies in the baseband frame, and may insert a PADI indicating information about the PADL in the BBHeader.

The baseband frame generator 210 may add the padding field based on the byte number of the data field. Here, if a plurality of data streams are mapped in the data field with no empty space, the padding field is not added. If a plurality of data streams is insufficiently mapped in the data field or the data field is not entirely mapped with the plurality of data streams, the padding field may be added. Accordingly, the baseband frame generator 210 may add the padding field to a remaining portion of an area of the baseband frame in which the data field is arranged.

Also, the byte number of the padding length field, that is, the number of bytes that the PADL occupies, may be set depending on the byte number of the added padding field, and information about the byte number of the set PADL may be indicated in the PADI by a bit unit.

In other words, if the padding field is added to the baseband frame, the PADL indicating the byte number of the padding field is generated and inserted in the baseband frame, and then, the PADI indicating whether the PADL exists or not and, if the PADL exists, how many bytes the PADL occupies may be generated and inserted in the BBHeader.

Accordingly, unlike a method in which the DFL field of the BBHeader being used in the existing DVB-T2 standard has a size of two bytes, directly stores and indicates information about the data field length, the current embodiment provides that the length of the data field may be calculated by calculating the length of the padding field. This will be described later.

The baseband frame generator 210 may generate the baseband frame in the order of the BBHeader, the padding length field, the padding field, and the data field. In this case, the padding field may include the padding length field, and thus, one or two bytes of the bytes of the padding field may be assigned to the padding length field. Then, the baseband frame created as described above may be applied to all exemplary embodiments of the present disclosure which will be described later.

Figure 3:
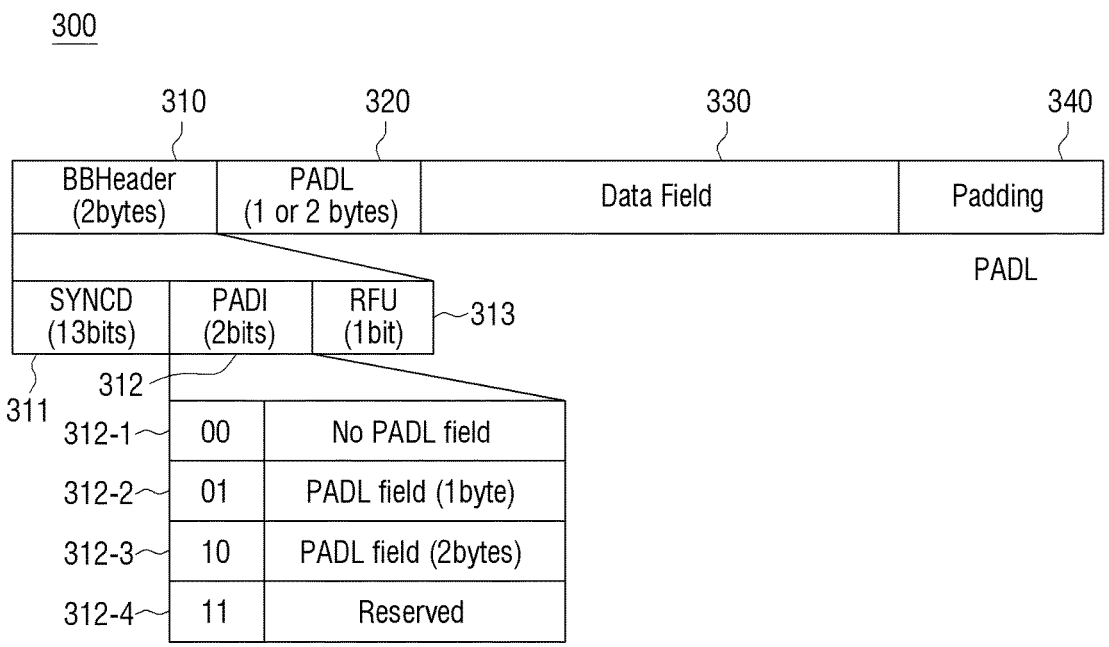
FIGS. 3 and 8 are views illustrating a structure of a baseband frame according to an embodiment.
Figure 8:
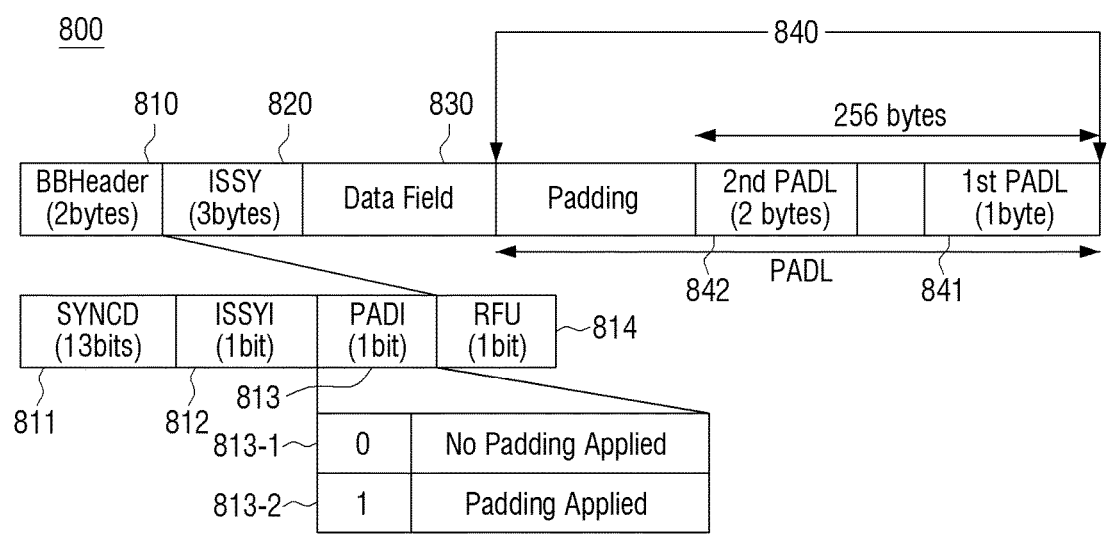

FIGS. 3 and 8 are views illustrating a structure of a baseband frame according to an exemplary embodiment of the present disclosure.

Referring to FIG. 3, a baseband frame 300 may include a BBHeader 310, a PADL 320, a data field 330, and a padding field 340.

The BBHeader 310 may include a SYNCD field 311, a PADI 312 and an RFU field 313. The SYNCD field 311 stores a bit distance from a starting point of the data field 330 to an UP field that is first transferred after the starting point, and the RFU field 313 is a field that is left to be used in the future.

The PADI 312 may indicate one of a first value indicating absence of the PADL, a second value indicating that the PADL is one byte, and a third value indicating that the PADL is two bytes.

If the baseband frame 300 includes only the BBHeader 310 and the data field 330 and the padding field 340 is not inserted, the baseband frame generator 210 is not necessary to insert the PADL 320 indicating the byte number of the padding field. Therefore, the baseband frame generator 210 records 00 as the first value 312-1 in the PADI 312 within the BBHeader 310. The 00, the first value 312-1, indicates that the PADL 320 is not inserted within the baseband frame 300.

However, if the baseband frame 300 includes the BBHeader 310, the data field 330 and the padding field 340, the baseband frame generator 210 inserts the PADL 320 indicating the byte number of the padding field 340. At this time, the byte number of the PADL 320 is determined depending on the byte number of the padding field 340, and then, 01, the second value 312-2 or 10, the third value 312-3 may be recorded in the PADI 312 depending on the determined byte number of the PADL 320.

Specifically, if the total bit number of the baseband frame 300 is $K_{bch}$, the total byte number becomes $K_{bch}/8$, and the maximum byte number of the data field 330 is $K_{bch}/8-2$, where 2 represents two bytes allocated for the BBHeader 310. At this time, since the byte number of the data field 330 is $K_{bch}/8-2$, the byte number of the padding field 340 is zero. In other words, since the entire area of the baseband frame 300 except an area for the BBHeader 310 is the data field, the baseband frame generator 210 does not insert the padding field 340 and PADL 320, and then, may record 00 312-1 in the PADI 312.

Also, if the byte number of the data field 330 is greater than $K_{bch}/8-2-257$ and less than $K_{bch}/8-2$, that is, if the padding field 340 is inserted and the byte number of the padding field 340 is greater than or equal to one and less than or equal to 256, one byte is sufficient to represent the byte number of the padding field 340. In this case, the baseband frame generator 210 sets the PADL 320 as one byte, and then, may record 01 312-2 in the PADI 312.

At this time, the byte number of the padding field 340, that is, the number of bytes of the padding field, is calculated by subtracting, from $K_{bch}/8$ which is the total byte number of the baseband frame 300, two which is the byte number of the BBHeader 310, one which is the byte number of the PADL 320, and the byte number of the data field 330.

On the other hand, if the byte number of the data field 330 is less than or equal to $K_{bch}/8-2-257$, that is, if the byte number of the padding field 340 is greater than 256, at least two bytes are needed to represent the byte number of the padding field 340. In this case, the baseband frame generator 210 sets the PADL 320 as two bytes, and then, may record 10 312-3 in the PADI 312.

At this time, the byte number of the padding field 340 is calculated by subtracting, from $K_{bch}/8$ which is the total byte number of the baseband frame 300, two which is the byte number of the BBHeader 310, two which is the byte number of the PADL 320, and the byte number of the data field 330.

The baseband frame generator 210 may also record 11 312-4 in the PADI 312 for use in the future, if necessary.

Figure 4:
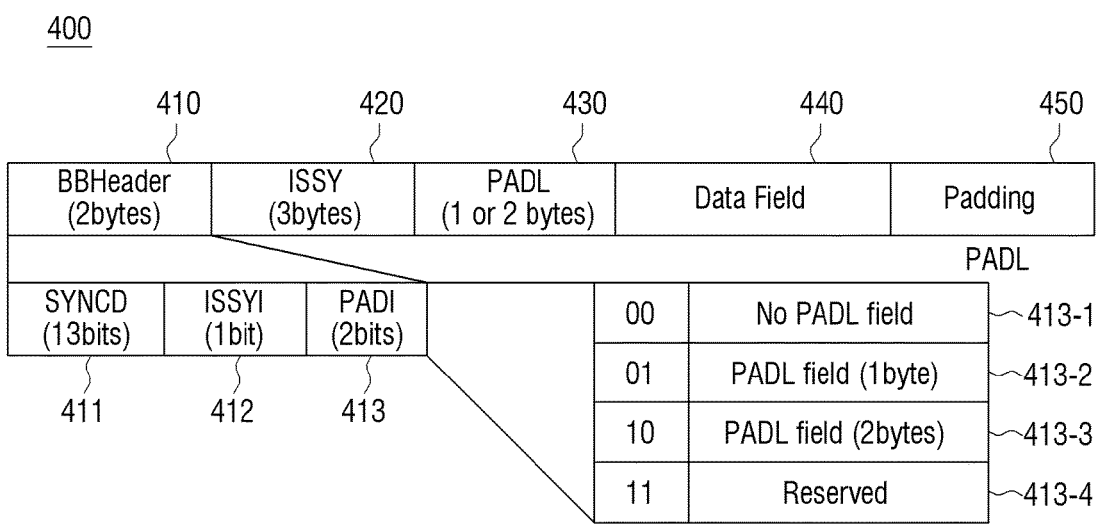

Referring to FIG. 4, a baseband frame 400 may include a BBHeader 410, an ISSY field 420, a PADL 430, a data field 440, and a padding field 450.

The BBHeader 410 may include a SYNCD field 411, an ISSY indicator field (ISSYI) 412, and a PADI 413. In other words, if the ISSY field 420 is added to the baseband frame 400, the baseband frame generator 210 may add the ISSYI 412 indicating presence or absence of the ISSY field 420 to the BBHeader 410.

Here, the SYNCD field 411 has already been described in detail; therefore, detailed description thereof will be omitted. The ISSY field 420 is used to transfer a clock counter value according to a clock modulation ratio and regenerate correct timing to restore the output stream by a receiver.

Also, the transfer method of the ISSY field 420 may be changed depending on the input stream format and mode. In the normal mode, the ISSY field 420 may be transferred by being added to a UP of the packetized stream, and in the high efficiency mode, it may be transferred by being added to the BB header of the BB frame.

Also, if a set value of the ISSYI 412 is one, the ISSYI 412 is enabled to calculate sync timing, and if the setting value of the input stream synchronization (ISSY) indicator field 412 is zero, the ISSYI 412 is disabled.

The PADI 413 may include one of a first value indicating absence of the PADL, a second value indicating that the PADL is one byte, and a third value indicating that the PADL is two bytes.

If the setting value of the ISSYI 412 is one, the baseband frame generator 210 may be activated and insert the ISSY field 420 in the baseband frame 400.

If the setting value of the ISSYI 412 is one, the baseband frame 400 includes only the BBHeader 410, the ISSY field 420 and the data field 440, and the padding field 450 is not inserted, the baseband frame generator 210 does not need to insert the PADL 430 indicating the byte number of the padding field 450. Accordingly, the baseband frame generator 210 records 00 as the first value 413-1, in the PADI 413 within the BBHeader 410. The 00, the first value 413-1, represents that the PADL 430 is not inserted in the baseband frame 400.

If, however, the baseband frame 400 includes the BBHeader 410, the ISSY field 420, the data field 440 and the padding field 450, the baseband frame generator 210 inserts the PADL 430 indicating the byte number of the padding field 450. At this time, the baseband frame generator 210 determines the byte number of the PADL 430 depending on the byte number of the padding field 450, and then, may record 01, the second value 413-2, or 10, the third value 413-3, in the PADI 413 depending on the determined byte number of the PADL 430.

Specifically, if the total bit number of the baseband frame 400 is $K_{bch}$, the total byte number becomes $K_{bch}/8$, and the maximum byte number of the data field 440 becomes $K_{bch}/8-5$, where 5 represents two bytes of the BBHeader 310 and three bytes of the ISSY field 420. At this time, since the byte number of the data field 440 becomes $K_{bch}/8-5$, the byte number of the padding field 450 becomes zero. In other words, since the entire area of the baseband frame 400 except the BBHeader 410 and the ISSY field 420 is the data field 440, the baseband frame generator 210 does not insert the padding field 450 and the PADL 430, and then, may record 00 413-1 in the PADI 413.

Also, if the byte number of the data field 450 is greater than $K_{bch}/8-5-257$ and less than $K_{bch}/8-5$, that is, if the padding field 450 is inserted and the byte number of the padding field 450 is greater than or equal to one and less than or equal to 256, one byte is sufficient to represent the byte number of the padding field 450. In this case, the baseband frame generator 210 sets the PADL 430 as one byte, and then, may record 01 413-2 in the PADI 413.

At this time, the byte number of the padding field 450, that is, the number of bytes of the padding field, is calculated by subtracting, from $K_{bch}/8$ which is the total byte number of the baseband frame 300, two which is the byte number of the BBHeader 410, three which is the byte number of the ISSY field 420, one which is the byte number of the PADL 430, and the byte number of the data field 440.

On the other hand, if the byte number of the data field 440 is less than or equal to $K_{bch}/8-5-257$, that is, if the byte number of the padding field 450 is more than 256, at least two bytes are needed to represent the byte number of the padding field 450. In this case, the baseband frame generator 210 sets the PADL 430 as two bytes, and then, may record 10 413-3 in the PADI 413.

At this time, the byte number of the padding field 450 is calculated by subtracting, from $K_{bch}/8$ which is the total byte number of the baseband frame 400, two which is the byte number of the BBHeader 410, three which is the byte number of the ISSY field 420, two which is the byte number of the PADL 430, and the byte number of the data field 440.

The baseband frame generator 210 may also record 11 413-4 in the PADI 413 for use in the future, if necessary.

If the set value of the ISSYI 412 is zero, the baseband frame generator 210 does not insert the ISSY field 420 within the baseband frame 400. Accordingly, if the set value of the ISSYI 412 is zero, the baseband frame generator 210 may generate the baseband frame in the same manner as described in FIG. 3.

Figure 5:
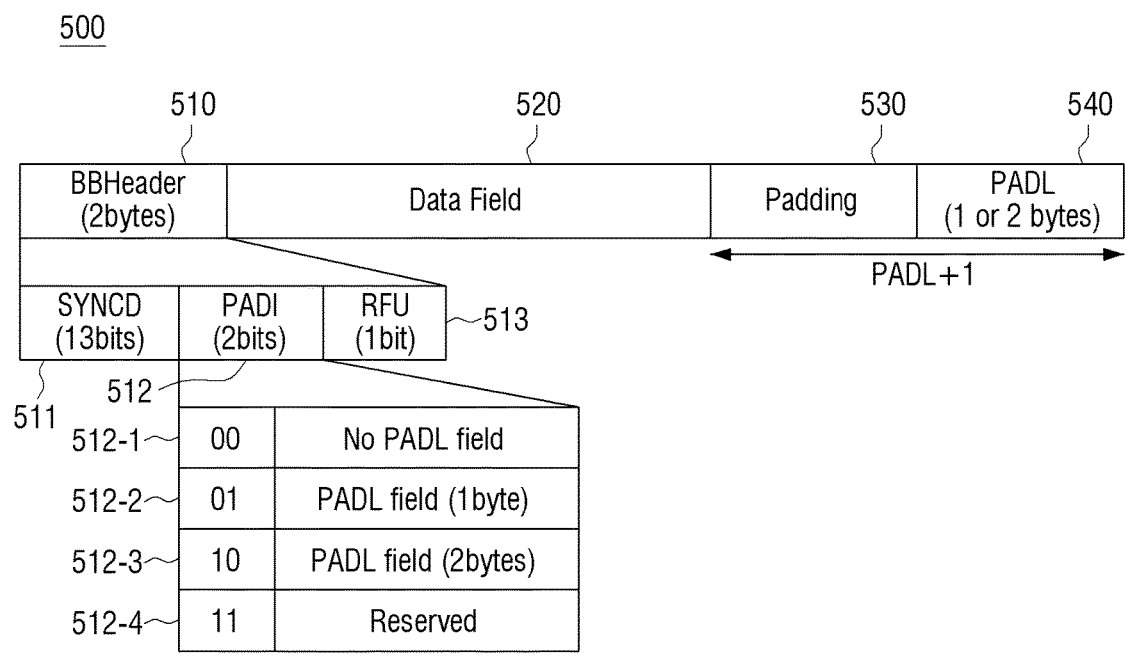

Referring to FIG. 5, a baseband frame 500 may include a BBHeader 510, a data field 520, a padding field 530 and a PADL 540.

Then, the BBHeader 510 may include a SYNCD field 511, a PADI 512 and an RFU field 513. The SYNCD field 511 stores a bit distance from a starting point of the data field 520 to an UP field that is first transferred after the starting point as described above, and the RFU field 513 is a field that is left to be used in the future.

The PADI 512 may include one of a first value defining absence of the PADL, a second value indicating that the PADL is one byte, and a third value indicating that the PADL is two bytes.

In order to generate the baseband frame 500 as illustrated in FIG. 5, the baseband frame generator 210 adds the padding field 530 based on the byte number of the data field 520, sets the byte number of the PADL 540 depending on the byte number of the added padding field 530, and may record information about the set byte number of the PADL 540 in a bit unit, namely, 00 512-1, 01 512-2, 10 512-3 and 11 512-4 in the PADI 512.

This is the same as the method in which the baseband frame generator 210 generates the baseband frame 300 as illustrated in FIG. 3.

However, the baseband frame 500 as illustrated in FIG. 5 has a structural difference in that the PADL 540 is added behind the padding field 530. Due to this structural difference, there may be a difference in the order to generate or read the baseband frame. However, insertion of the PADI indicating the presence or absence of the PADL and the byte number of the PADL, indicating the byte number of the padding field, is the same.

Figure 6:
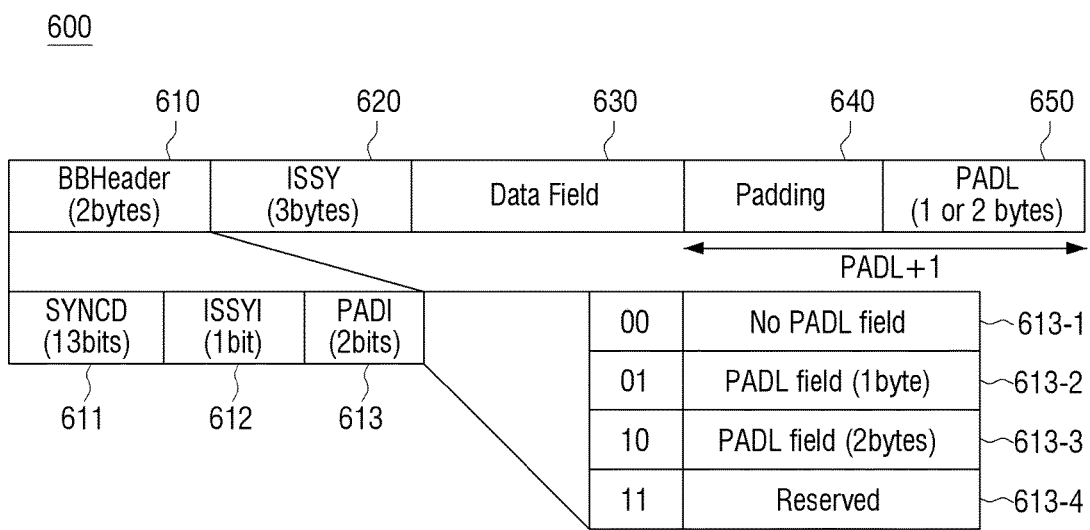

Referring to FIG. 6, a baseband frame 600 may include a BBHeader 610, an ISSY field 620, a data field 630, a padding field 640 and a PADL 650.

The BBHeader 610 may include a SYNCD field 611, an ISSYI 612, and a PADI 613. In other words, if the ISSY field 620 is added to the baseband frame 600, the baseband frame generator 210 may add the ISSYI 612 indicating presence or absence of the ISSY field 620 to the BBHeader 610.

Specifically, in order to generate the baseband frame 600 as illustrated in FIG. 6, the baseband frame generator 210 adds the padding field 640 based on the byte number of the data field 630, sets the byte number of the PADL 650 depending on the byte number of the added padding field 640, and may record information about the set byte number of the PADL 650 in a bit unit, namely, 00 613-1, 01 613-2, 10 613-3, and 11 613-4 in the PADI 613.

If the set value of the ISSYI 612 is one, the byte number of the padding field 640 is calculated by considering that the ISSY field 620 is inserted in the baseband frame 600. If the set value of the ISSYI 612 is zero, the byte number of the padding field 640 is calculated by considering that the ISSY field 620 is not inserted in the baseband frame 600.

This is the same as the method in which the baseband frame generator 210 generates the baseband frame 400 as illustrated in FIG. 4.

However, the baseband frame 600 as illustrated in FIG. 6 has a structural difference in that the PADL 650 is added behind the padding field 640. Due to this structural difference, there may be a difference in the order to generate or read the baseband frame. However, insertion of the PADI indicating the presence or absence if the PADL and the byte number of the PADL, indicating the byte number of the padding field, is the same.

Figure 7:
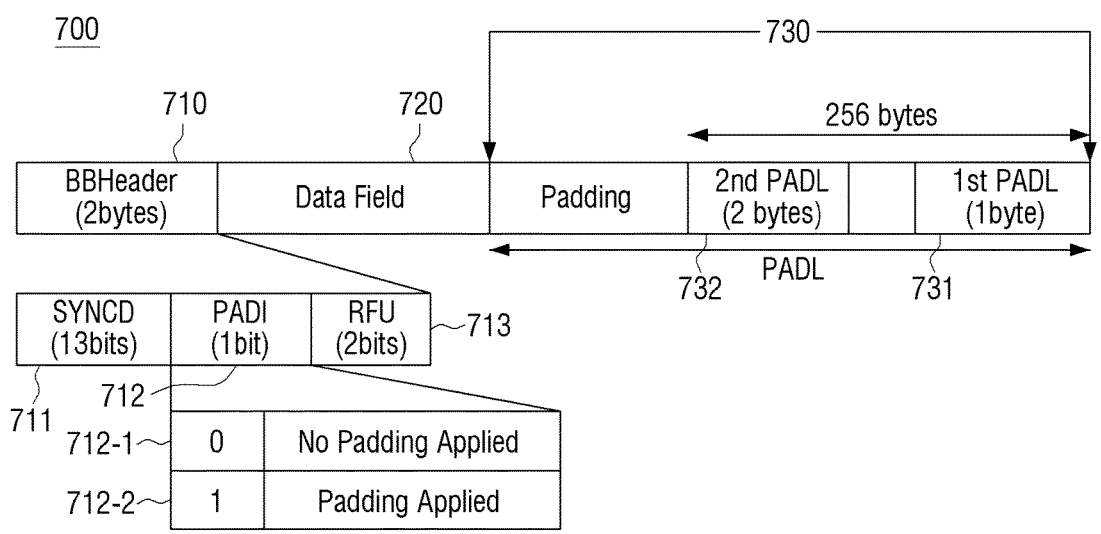

According to FIG. 7, if the byte number of a padding field 730 is less than or equal to a predetermined size, the baseband frame generator 210 inserts one PADL 731 indicating the total byte number of the padding field 730 within the padding field 730, and if the byte number of the padding field 730 is greater than the predetermined size, the baseband frame generator 210 inserts a first PADL 731 and a second PADL 732 within the padding field 730. The first PADL 731 may indicate the presence of the second PADL 732 within the padding field 730, and the second PADL 732 may indicate the total byte number of the padding field 730.

The baseband frame 700 may include a BBHeader 710, a data field 720 and the padding field 730 including the first PADL 731 and the second PADL 732.

Then, the BBHeader 710 may include a SYNCD field 711, a PADI 712 and an RFU field 713. The SYNCD field 711 stores a bit distance from a starting point of the data field 720 to an UP field that is first transferred after the starting point as described above, and the RFU field 713 is a field that is left to be used in the future.

The PADI 712 may include a first value defining a case that the padding field 730 does not exist or a second value defining a case that the padding field 730 exists.

If the baseband frame 700 includes only the BBHeader 710 and the data field 720, and the padding field 730 is not inserted, the baseband frame generator 210 is not necessary to insert any of the first PADL 731 and second PADL 732 to indicate the byte number of the padding field. Therefore, the baseband frame generator 210 records zero as the first value 712-1 in the PADI 712 within the BBHeader 710, and the 0, the first value 712-1, indicates that the padding field 730 is not inserted within the baseband frame 700.

Here, the padding field 730 includes the first PADL 731 and second PADL 732 differently from FIGS. 3, 4, 5 and 6. In other words, if the byte number of the padding field 730 is 256, the padding field 730 includes 255 bytes of padding and one byte of the first PADL 731. If the byte number of the padding field 730 is 356 which is greater than 256, the padding field 730 may include the inserted padding of 353 bytes, the first PADL 731 of one byte, and the second PADL 732 of two bytes.

Here, if the total byte number of the padding field 730 is more than 256, the baseband frame generator 210 inserts the first PADL 731 and the second PADL 732 in the padding field 730. The first PADL 731 is set to a value expressed by one byte or less, and the second PADL 732 may be inserted in a position corresponding to the set value of the first PADL 731 with a size of two bytes.

In other words, the first PADL 731 may be set to one of 256 values expressed by one byte or less. For example, if the set value of the first PADL 731 is 255, the second PADL 732 exists in the 255th and 256th bytes from the byte at which the first PADL 731 is located.

The structure of the baseband frame 700 is the same as that of the baseband frame in the above embodiments in that, when the baseband frame 700 includes the BBHeader 710, the data field 720 and the padding field 730, the baseband frame generator 210 may insert the PADL indicating the byte number of the padding field 730.

Specifically, if the total bit number of the baseband frame 700 is $K_{bch}$, the total byte number becomes $K_{bch}/8$, and the maximum byte number of the data field 720 is $K_{bch}/8-2$, where 2 represents two bytes allocated for the BBHeader 710. At this time, since the byte number of the data field 720 becomes $K_{bch}/8-2$, the byte number of the padding field 730 is zero. In other words, since the entire area of the baseband frame 700 except an area for the BBHeader 710 is the data field 720, the baseband frame generator 210 does not insert the padding field 730, the first PADL 731 and second PADL 732, and then, may record 0 712-1 in the PADI 712.

Also, if the byte number of the data field 720 is greater than $K_{bch}/8-2-256$ and less than $K_{bch}/8-2$, that is, if the padding field 730 is inserted and the byte number of the padding field 730 is greater than or equal to one and less than or equal to 256, the baseband frame generator 210 may insert the first PADL 731 of one byte within the padding field 730 in order to indicate the byte number of the padding field 730, and record 1 712-2 indicating that the padding field 730 has been inserted in the PADI 712.

Here, as described above, if the byte number of the padding field 730 is 256, the padding field 730 includes 255 bytes of padding and one byte of the first PADL 731. The reason that 256 instead of 257 is subtracted from $K_{bch}/8-2$ in calculating the minimum byte number of the data field 720 is because the first padding length field 731 is inserted within the padding field 730.

At this time, the byte number of the padding field 730 is calculated by subtracting, from $K_{bch}/8$ which is the total byte number of the baseband frame 700, two which is the byte number of the BBHeader 710 and the byte number of the data field 720.

On the other hand, if the byte number of the data field 720 is less than or equal to $K_{bch}/8-2-256$, namely, when the byte number of the padding field 730 is greater than 256, the baseband frame generator 210 may insert the second PADL 732 of two bytes within the padding field 730 in order to indicate the byte number of the padding field 730. In this case, the baseband frame generator 210 may also insert the first PADL 731 indicating the presence of the second PADL 732 within the padding field 730, and record 1 712-2 indicating that the padding field 730 has been inserted in the PADI 712.

Here, a starting point of the second PADL 732 is a place in which the $256_{th}$ byte from the end of the baseband frame 700, where the first PADL 731 is inserted, is located. The first PADL 731 may store information indicating the presence of the second PADL 732 as described above by setting and storing a specific value (e.g. 255).

Also, as described above, if the byte number of the padding field 730 is 356 which is greater than 256, the padding field 730 may include the inserted padding of 353 bytes, the first PADL 731 of one byte, and the second PADL 732 of two bytes.

Further, as in the case that the byte number of the padding field 730 is greater than or equal to one and less than or equal to 256, the byte number of the padding field 730 is calculated by subtracting from $K_{bch}/8$ which is the total byte number of the baseband frame 700, two which is the byte number of the BBHeader 710 and the byte number of the data field 720.

Referring to FIG. 8, a baseband frame 800 may include a BBHeader 810, an ISSY field 820, a data field 830 and a padding field 840.

The BBHeader 810 may include a SYNCD field 811, an ISSYI 812, a PADI 813 and an RFU field 814. In other words, if the ISSY field 820 is added to the baseband frame 800, the baseband frame generator 210 may add the ISSYI 812 indicating the presence or absence of the ISSY field 820 to the BBHeader 810.

However, if the byte number of the padding field 840 is less than or equal to a predetermined size, the baseband frame generator 210 adds a PADL 841 indicating the byte number of the padding field 840 in the baseband frame 800, and if the byte number of the padding field 840 is greater than the predetermined size, the baseband frame generator 210 may add a second PADL 842 indicating the byte number of the padding field 840 and a first PADL 841 indicating the presence of the second PADL 842 in the baseband frame 800.

If the set value of the ISSYI 812 is one, the byte number of the padding field 840 is calculated by considering that the ISSY field 820 has been inserted in the baseband frame 800. If the set value of the ISSYI 812 is zero, the byte number of the padding field 840 is calculated by considering that the ISSY field 820 is not inserted in the baseband frame 800.

In other words, if the set value of the ISSYI 812 is zero, the byte number of the padding field 840 may be calculated in the same manner as FIG. 7. If, however, the set value of the ISSYI 812 is one and the set value of the PADI 813 is zero, the padding field 840 does not exist so that the byte number of the data field 830 is calculated by subtracting from the $K_{bch}/8$ which is the total byte number of the baseband frame, two which is the byte number of the BBHeader and three which is the byte number of the ISSY field.

Also, if the set value of the ISSYI 812 is one and the set value of the PADI 813 is one, and if the byte number of the data field 830 is greater than $K_{bch}/8-5-256$ and less than $K_{bch}/8-5$, that is, if the padding field 840 is inserted and the byte number of the padding field 840 is greater than or equal to one and less than or equal to 256, the baseband frame generator 210 may insert a first PADL 841 of one byte within the padding field 840 in order to indicate the byte number of the padding field 840, and record 1 813-2 indicating that the padding field 840 has been inserted in the PADI 813.

Also, as described above, if the byte number of the padding field 840 is 256, the padding field 840 includes 255 bytes of padding and one byte of the first PADL 841. The reason that 256 not 257 is subtracted in $K_{bch}/8-2$ in calculating the minimum byte number of the data field 830 is because the first PADL 841 is inserted within the padding field 840.

Further, if the set value of the ISSYI 812 is one and the set value of the PADI 813 is one, and if the byte number of the data field 830 is less than or equal to $K_{bch}/8-5-256$, that is, if the byte number of the padding field 840 is more than 256, the baseband frame generator 210 may insert a second PADL 842 of two bytes within the padding field 840 in order to indicate the byte number of the padding field 840. In this case, the baseband frame generator 210 may also insert the first PADL 841 indicating the presence of the second PADL 842 within the padding field 840, and record 1 813-2 indicating that the padding field 840 has been inserted in the PADI 813.

Also, as described above, if the byte number of the padding field 840 is 356 which is greater than 256, the padding field 840 may include the inserted padding of 353 bytes, the first PADL 841 of one byte, and the second PADL 842 of two bytes.

Here, if the total byte number of the padding field 840 is greater than 256, the baseband frame generator 210 inserts the first PADL 841 and second PADL 842 in the padding field 840. The first PADL 841 is set to a value expressed by one byte or less, and the second PADL 842 may be inserted in a position corresponding to the set value of the first PADL 841 with a size of two bytes.

However, if the byte number of the padding field 840 is greater than or equal to one and less than or equal to 256 or more than 256, that is, only if there is any padding greater than or equal to one, the byte number of the padding field 840 is calculated by subtracting, from the $K_{bch}/8$ which is the total byte number of the baseband frame 800, two which is the byte number of the BBHeader 810, three which is the byte number of the ISSY field 820, and the byte number of the data field 830.

FIGS. 9A and 9B illustrate a table indicating values that are set in a PADI when a padding field of one byte is inserted according to an exemplary embodiment of the present disclosure.

Referring to FIG. 9A, a PADI may include one of a first value defining the absence of PADL and padding field, a second value indicating that the PADL does not exist and the padding field is one byte, a third value indicating that the PADL is one byte, and a fourth value indicating that the PADL is two bytes.

Here, if the byte number of the padding field is zero, the baseband frame generator 210 does not insert the padding field and the PADL, and records the first value in the padding indicator field. If the byte number of the padding field is one, the baseband frame generator 210 does not insert the PADL, and records the second value in the padding indicator field. If the byte number of the padding field is more than 1 and less than or equal to 256, the baseband frame generator 210 sets the PADL as one byte, and records the third value in the padding indicator field. If the byte number of the padding field is greater than 256, the baseband frame generator 210 sets the PADL as two bytes, and records the fourth value in the padding indicator field.

If there is no padding field, the baseband frame generator 210 does not insert the PADL, and may record 00 910 in the PADI.

If the padding field is one byte, the baseband frame generator 210 does not insert separately the PADL by allowing the PADI to directly indicate that one byte padding field is padded, and may record 01 920 in the padding indicator field.

If the byte number of the padding field is more than one, the baseband frame generator 210 may set the byte number of the PADL to one or two depending on the byte number of the padding field, and record 10 930 or 11 940 in the padding indicator field.

In other words, the exemplary embodiment as illustrated in FIG. 9A may be applied to all the embodiments of the present disclosure as described above. In other words, in all the embodiments, if the padding field is one byte, the PADI directly indicates that one byte padding field is padded and the PADL is not inserted separately.

Referring to FIG. 9B, the PADI may include one of a first value defining the absence of PADL and padding field, a second value indicating that the PADL does not exist and the padding field is one byte, and a third value indicating that the PADL is two bytes.

Then, if the byte number of the padding field is zero, the baseband frame generator 210 does not insert the padding field and the PADL, and may record the first value in the PADI. If the byte number of the padding field is one, the baseband frame generator 210 does not insert the PADL, and may record the second value in the PADI. If the byte number of the padding field is more than one, the baseband frame generator 210 sets the PADL as two bytes, and may record the third value in the padding indicator field.

If the there is no padding field, the baseband frame generator 210 may not insert the PADL, and may record 00 950 in the padding length field.

If the padding field is one byte, the baseband frame generator 210 may not insert separately the PADL by allowing the PADI to directly indicate that one byte padding field is padded, and may record 01 960 in the PADI.

If the byte number of the padding field is more than one, the baseband frame generator 210 may fixedly set the byte number of the PADL to two regardless of the byte number of the padding field, and record 10 970 in the PADI.

Also, the baseband frame generator 210 may record 11 980 in the PADI for use in the future.

The exemplary embodiment as illustrated in FIG. 9B may be applied to all the embodiments of the present disclosure as described above. In other words, in all the embodiments, if the padding field is one byte, the PADL directly indicates that one byte padding field is padded, the PADL is not inserted separately, and, if the byte number of the padding field is more than one, the byte number of the PADL is fixedly set to two.

The method for generating the baseband frame as illustrated in FIG. 9B has a difference in that the PADL is fixed as two bytes compared with the method for generating the baseband frame as illustrated in FIG. 9A. In other words, in the case of the FIG. 9B, since the PADL is, if necessary, fixed as two bytes to indicate the byte number of the padding field, the baseband frame may have a relatively simple structure compared with FIG. 9A.

In order to apply the method for generating the baseband frame as illustrated in FIG. 9B to the embodiments as illustrated in FIGS. 7 and 8, the baseband frame generator 210 assigns the last two bytes of the baseband frame to the PADL, and may store therein information indicating the length of the padding field which is subtracted, from $K_{bch}/8$ which is the total byte number of the baseband frame, the byte number of the BBHeader or the sum of the byte number of the BBHeader and the byte number of the ISSY field, and the byte number of the data field.

The baseband frame generator 210 may generate a baseband frame in the order of a baseband header, a PADL, a padding field, and a data field. In this case, the padding field may include the PADL, and thus, one or two bytes of the bytes of the padding field may be assigned to the PADL. Then, the baseband frame generated in such manner may be applied to all the embodiments of the present disclosure as described above.

Figure 10:
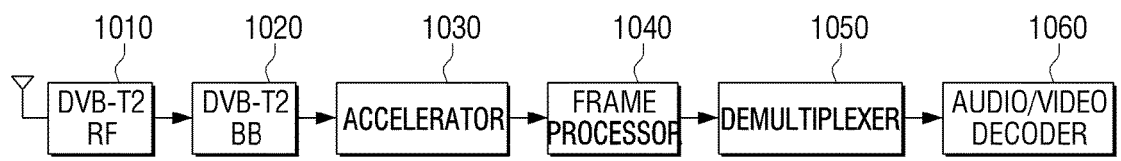
FIG. 10 is a block diagram illustrating a receiving process of a receiver using a DVB-T2 method.

FIG. 10 is a block diagram illustrating a receiving process of a receiver using a DVB-T2 method.

A receiver 1000 includes a DVB-T2 RF module 1010, a DVB-T2 BB module 1020, an accelerator 1030, a frame processor 1040, a demultiplexer 1050, and an audio/video decoder 1060.

The DVB-T2 RF module 1010 may receive transmitted signals of the DVB-T2 standard.

If receiving the transmitted signals from the DVB-T2 RF module 1010, the DVB-T2 BB module 1020 starts to operate, and may perform baseband signal processes (synchronization, channel estimation, equalization, deinterleaving, etc.).

The accelerator 1030 performs LDPC and BCH decoding for the DVB-T2, and, in addition, may perform fast Fourier transform (FFT) for the DVB-T2.

The frame processor 1040 may process a data area by using header information of the baseband frame of the DVB-T2.

The demultiplexer 1050 may regenerate signals such as TS, GCS, GFPS, GSE, etc. received from a transmitter by performing reverse processes of a stream adaptation module and a mode adaptation module.

The audio/video decoder 1060 may play back audio/video signals from the signals such as TS, GCS, GFPS, GSE, etc.

Figure 11:
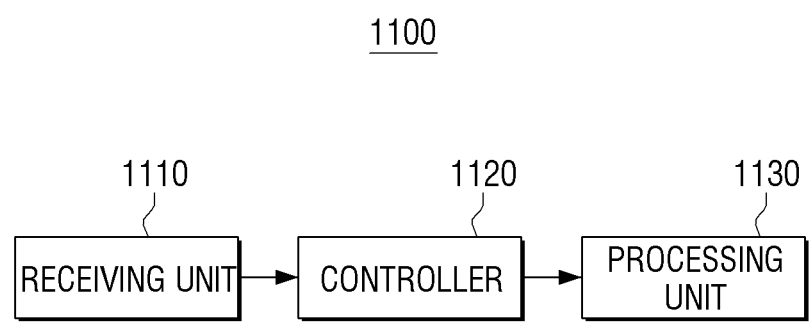
FIG. 11 is a block diagram illustrating a configuration of a receiver according to an exemplary embodiment of the present disclosure.

FIG. 11 is a block diagram illustrating a configuration of a receiver according to an exemplary embodiment of the present disclosure.

The receiver 1100 includes a receiving unit 1110, a controller 1120 and a processing unit 1130.

The receiving unit 1110 may receive a transmission stream including a baseband frame like the DVB-T2 RF module 1010 as illustrated in FIG. 10.

The controller 1120 may calculate a size of the data field of the baseband frame.

In detail, the controller 1120 may perform functions which are performed by the DVB-T2 BB module 1020, the accelerator 1030 and the frame processor 1040 as illustrated in FIG. 10. In other words, the controller 1120 may perform baseband signal processes by performing synchronization, channel estimation, equalization, deinterleaving, etc. from the received transmission stream, and then, may detect a baseband frame by performing the LDPC and BCH decoding. Also, the controller 1120 may perform a function to process the data area by using the header information of the baseband frame.

The baseband frame may include a baseband header, a data field, a padding field, and a PADL indicating the byte number of the padding field. The BBHeader includes a PADI indicating information about the PADL.

Accordingly, the controller 1120 may detect information about the PADL based on the padding indicator field, calculate the byte number of the padding field based on the detected information, and calculate the byte number of the data field based on the byte number of the baseband header, the byte number of the PADL, and the byte number of the padding field.

Also, if the baseband frame further includes an ISSY field, the controller 1120 may calculate the byte number of the data field based on the byte number of the baseband header, the byte number of the PADL, the byte number of the ISSY field and the byte number of the padding field.

Then, the processing unit 1130 may process a plurality of data streams mapped in the data field of the baseband frame. In other words, the processing unit 1130 may regenerate signals such as TS, GCS, GFPS, GSE, etc. received from a transmitter by performing reverse processes of a stream adaptation module and a mode adaptation module like the demultiplexer 1050 as illustrated in FIG. 10.

FIG. 12 is a flowchart for explaining a stream generating method of a transmitter according to an exemplary embodiment of the present disclosure.

According to a method as illustrated in FIG. 12, a baseband frame including a baseband header, a data field and a padding field may be generated (S1210).

Then, a plurality of data streams may be mapped in the data field (S1220). Here, the baseband frame may include a PADL indicating the byte number of the padding field, and the BBHeader may include a PADI indicating information for the PADL.

In detail, a transmitter may add the padding field based on the byte number of the data field, set the byte number of the PADL depending on the byte number of the added padding field, and indicate information for the set byte number of the PADL in the PADI in a bit unit.

Here, the PADI may include one of a first value defining the absence of the PADL, a second value indicating that the PADL is one byte, and a third value indicating that the PADL is two bytes.

In detail, if the byte number of the padding field is zero, the padding field and the PADL may not be inserted, and the first value may be recorded in the PADI. If the byte number of the padding field is more than or equal to one and less than or equal to 256, the PADL may be set as one byte, and the second value may be recorded in the PADI. If the byte number of the padding field is greater than 256, the PADL may be set as two bytes, and the third value may be recorded in the PADI.

Also, if an ISSY field is added to the baseband frame, an ISSYI indicating the presence or absence of the ISSY field may be added to the baseband header.

On the other hand, if the byte number of the padding field is less than or equal to a predetermined size, one PADL indicating the total byte number of the padding field may be inserted within the padding field, and if the byte number of the padding field is more than the predetermined size, a first PADL and a second PADL may be inserted within the padding field. The first PADL may indicate the presence of the second PADL within the padding field, and the second PADL may indicate the total byte number of the padding field.

Here, the PADI may include a first value defining a case that the padding field does not exist or a second value defining a case that the padding field exists. Also, if the byte number of the padding field is zero, the padding field and the PADL are not inserted, and then, the first value is recorded in the PADI. If the byte number of the padding field is more than or equal to one and less than or equal to 256, the PADL is set as one byte, and then, the second value is recorded in the PADI. If the byte number of the padding field is more than 256, the first and second padding length fields are added to the baseband frame, and the second value may be recorded in the PADI. At this time, the first PADL is one byte, and the second PADL is two bytes.

Also, if the total byte number of the padding field is greater than 256, the first and second padding length fields are inserted in the padding field, the first PADL is set to a value expressed by one byte or less, and the second PADL may be inserted in a place corresponding to the set value of the first PADL with a size of two bytes.

Also, if the ISSY field is added to the baseband frame, an ISSYI indicating the presence or absence of the ISSY field may be added to the baseband frame.

On the other hand, the PADI may include one of a first value defining the absence of PADL and padding field, a second value indicating that the PADL does not exist and the padding field is one byte, a third value indicating that the PADL is one byte, and a fourth value indicating that the PADL is two bytes.

In this case, if the byte number of the padding field is zero, the padding field and the PADL are not inserted, and then, the first value is recorded in the padding indicator field. If the byte number of the padding field is one, the PADL is not inserted, and then, the second value is recorded in the PADI. If the byte number of the padding field is greater than one and less than or equal to 256, the PADL is set as one byte, and the third value may be recorded in the PADI. If the byte number of the padding field is greater than 256, the PADL is set as two bytes, and then the fourth value may be recorded in the PADI.

On the other hand, the PADI may include one of a first value defining the absence of PADL and padding field, a second value indicating that the PADL does not exist and the padding field is one byte, and a third value indicating that the PADL is two bytes.

In this case, if the byte number of the padding field is zero, the padding field and the PADL are not inserted, and then, the first value is recorded in the PADI. If the byte number of the padding field is one, the PADL is not inserted, and then, the second value is recorded in the PADI. If the byte number of the padding field is greater than one, the PADL is set as two bytes, and the third value may be recorded in the PADI.

FIG. 13 is a flowchart for explaining a control method of a receiver according to an embodiment of the present disclosure.

According to a method as illustrated in FIG. 13, a transmission stream including a baseband frame may be received (S1310).

Then, a size of a data field of the baseband frame may be calculated (S1320). Here, information about a PADL may be detected based on the PADI, the byte number of the padding field may be calculated based on the detected information, and the byte number of the data field may be calculated based on the byte number of the baseband header, the byte number of the PADL, and the byte number of the padding field.

Also, when the baseband frame further includes an ISSY field, the BBHeader further includes an ISSYI indicating the presence or absence of the ISSY field, and the byte number of the data field may be calculated based on the byte number of the baseband header, the byte number of the PADL, the byte number of the ISSY field, and the byte number of the padding field.

Next, a plurality of data streams mapped in the data field of the baseband frame may be processed (S1330).

According to an exemplary embodiment, a non-transitory computer-readable medium in which a program performing sequentially the control method according to the embodiment of the present disclosure is stored may be provided.

For example, a non-transitory computer-readable medium in which a program performing a step of generating a baseband frame including a baseband header, a data field, and a padding field, a step of mapping a plurality of data streams to the data field, and a step of generating a transmission stream including the baseband frame is stored may be provided.

Also, for example, a non-transitory computer-readable medium in which a program performing a step of calculating a size of the data field of the baseband frame, and a step of processing the plurality of data streams mapped to the data field of the baseband frame is stored may be provided.

Contrary to a medium to store data for a short moment, such as a register, a cache, a memory, etc., the non-transitory computer-readable medium refers to a medium that can store data in a semi-permanent manner and that can be read by devices. In detail, the above-described various applications or programs may be stored in and provided with the non-transitory computer readable medium such as a compact disc (CD), a digital versatile disc (DVD), a hard disc, a Blu-ray disc, an universal serial bus (USB), a memory card, a read-only memory (ROM), etc.

Also, in FIGS. 2 and 11 that illustrate the transmitter 200 and the receiver 1100, respectively, a bus is not illustrated, but communication between components of each of the transmitter and the receiver may be performed through a bus. Also, each component may include a processor to perform various steps as described above, such as a central processing unit (CPU), a microprocessor, etc.

Further, each of the components of the transmitter 200 and the receiver 1100 may be embodied as functional block structures and various processing operations. These functional blocks may be embodied as the various numbers of hardware and/or software structures that execute particular functions. For example, each component may use a direct circuit structure, such as a memory, processing, logic, a look-up table, etc. that may execute various functions through controls of one or more microprocessors or other control apparatuses.

While the embodiments of the present disclosure have been described, additional variations and modifications of the embodiments may occur to those skilled in the art once they learn of the basic inventive concepts. Therefore, it is intended that the appended claims shall be construed to include both the above embodiments and all such variations and modifications that fall within the spirit and scope of the inventive concepts.

What is claimed is:

1. A transmitter comprising:
a packet generator configured to generate a packet comprising a header and a payload; and
a transmitter configured to transmit a signal which is generated based on the packet,
wherein the header comprises a first field,
wherein the first field comprises one of a first value, a second value and a third value,
wherein the first value indicates absence of a second field and a third field in the packet,
wherein the second value indicates presence of the second field of which a length is 1 byte,
wherein the third value indicates presence of the second field of which the length is 2 bytes,
wherein the second field comprises length information indicating a length of padding,
wherein if the length of padding is 1 byte and the first field comprises the second value, the second field is used as padding of 1 byte,
wherein if a number of bytes of the third field is zero, the first field comprises the first value,
wherein if the number of bytes of the third field is in a range of 1 to a threshold value, the first field comprises the second value, and
wherein if the number of bytes of the third field is greater than the threshold value, the first field comprises the third value.

2. The transmitter of claim 1, wherein the packet generator, if an input system synchronizer (ISSY) field is added to the packet, adds an ISSY indicator field indicating whether the IS SY field is present in the header.

* * * * *